(No Model.) 2 Sheets—Sheet 1.
J. B. HYDE.
UNDERGROUND ELECTRIC CONDUCTOR.
No. 284,854. Patented Sept. 11, 1883.
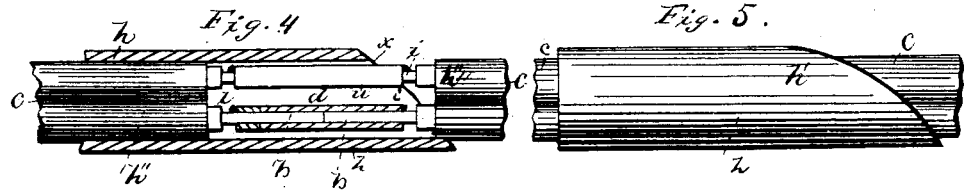
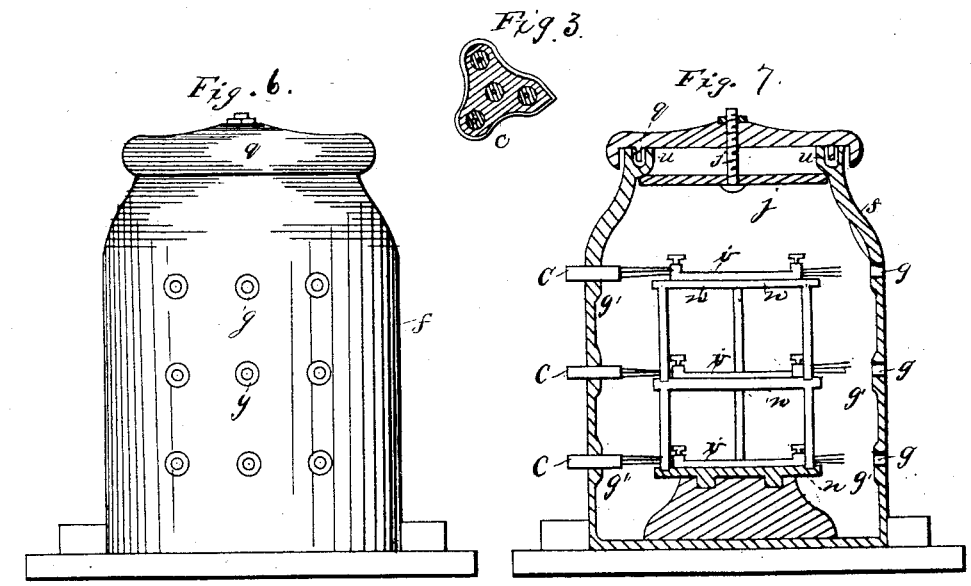
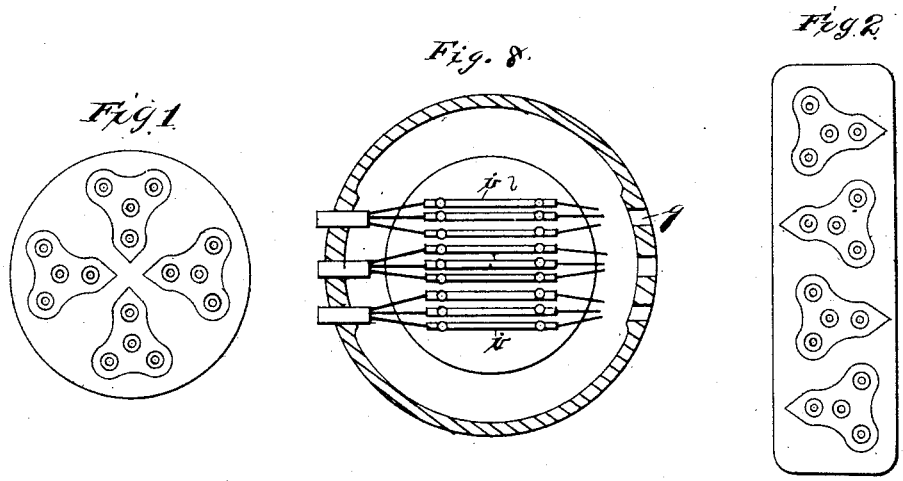
WITNESSES
Chas. R. Burr
Geo H. Harvey
INVENTOR
J. Burrows Hyde
per O. E. Duff
Attorney (No Model.) 2 Sheets—Sheet 2.
J. B. HYDE.
UNDERGROUND ELECTRIC CONDUCTOR.
No. 284,854. Patented Sept. 11, 1883.
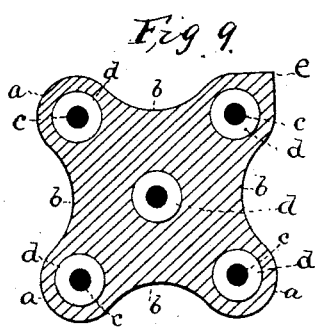
WITNESSES
Chas. R. Burr
W. E. Bowen
INVENTOR
J. Burrows Hyde
per O. E. Duffy
Attorney

UNITED STATES PATENT OFFICE.

J. BURROWS HYDE, OF NEW YORK, N. Y.

UNDERGROUND ELECTRIC CONDUCTOR.

SPECIFICATION forming part of Letters Patent No. 284,854, dated September 11, 1883.

Application filed May 28, 1883. (No model.)

*To all whom it may concern:*

Be it known that I, J. BURROWS HYDE, a citizen of the United States of America, residing at New York, in the county of New York and State of New York, have invented certain new and useful Improvements in Underground Electric Conductors and Apparatus Connected therewith, of which the following is a specification, reference being had therein to the accompanying drawings.

My invention relates to that class of electric conductors which consist in metallic wires covered with cotton or other fibrous material saturated with a non-conducting medium, and then enveloped in an arming of lead to form an underground or under-water cable.

The cable which I employ is of peculiar form, is made to carry a series of wires—usually four—and in its cross-section has a shape approximating to an equilateral triangle with the angles rounded, and for which cable I have obtained Letters Patent No. 277,036, May 8, 1883. Lead-covered electric cables of variously-shaped cross-section are well known, and have almost exclusively been formed by lead-pipe machines by the substitution of a peculiar molding-die to form the cable, in place of the cylindrical die for the pipe, and through which molding-die the covered insulated wires are guided from reels, so that the cable emerges from the apparatus complete with the wires embedded in the lead.

Hitherto the shape of the cable and position of the wires therein have admitted the construction of but one cable at a time; but my improvement allows the forming of two or more cables simultaneously, each complete with its insulated wires—a facility due particularly to the cross-section shape of the cable, and effected by the construction of a compound die that may have either a circular or flat exterior. I have, however, improved the shape of the cable as patented May 8, 1883, by rounding two of the angles only, leaving one of the angles with a sharpish outline, to readily distinguish it from the other two by the fingers, as an indicator, to facilitate the finding of any particular wire by counting from right to left therefrom; and to avoid unequal stretching of an outside wire in winding the cable upon a reel, I twist the cable from end to end—say one turn in three feet, more or less—which so changes the positions of the wires that the stretching is equalized.

My invention further consists in a novel arrangement by which I am enabled to unite the wires of the separate commercial lengths of the cable to form a continuous line; and my improvement further consists in an air and water tight testing-chamber of peculiar construction and arrangement, designed to be buried in the earth at proper interval along the line, to facilitate inspecting and testing the wires when necessary; and my invention finally consists in the peculiar construction of cable herein shown, which in its transverse section presents a cross with four arms or branches, the ends of which are rounded outward, the fourth being pointed or sharp, as a counter, and the subtending angle curved inward, each arm carrying an insulated wire near its outer end, while a fifth insulated wire is placed in the center space between the four, as shown.

In my Patent No. 277,036, I have described and claimed an exterior coating of non-conducting media for a lead-covered electric cable composed of adhesive substances.

My improvement now further consists in combining finely-pulverized dry peaty matters with one or more of such substances as resins, gums, bitumen-pitch, wax, &c., tempered with any proper oil, or in place of the above the proper distillates or residuums of petroleum in any proper proportions to form such exterior coating to be both adhesive and pliable. The peat, being in the condition of partially-oxidized carbon, combined with hydrogen, readily unites under heat with the ingredients named, and forms a smooth homogenic compound.

In constructing the cable it is highly necessary that the lead be free from the admixture of zinc, tin, antimony, bismuth, copper, or iron, as such impurities greatly facilitate destruction of the lead. I have seen a one-inch lead pipe that had laid in the earth over thirty years free from corrosion; another sample from the same locality made worthless by decay in less than ten years' exposure.

Figure 1 in the drawings represents a cross-section of a circular-shaped compound molding-die, and Fig. 2 a similar section of a flatsided compound die, each being made for four distinct cables of my improved form with the projecting indicator, as described and shown, each cable carrying four thread-covered insulated wires that are drawn from reels through the dies by the lead, and with which they emerge covered from the press as complete cables. I do not more fully describe the details of the arrangement of the dies nor of the apparatus therefor, as I make separate application for Letters Patent for such invention. Fig. 3 shows full-size section of the cable $c$. Fig. 4 shows a side elevation in section of my method for uniting separate lengths of the cable, and Fig. 5 represents an exterior view of the same.

$c$ shows the cable; $h$, a lead sleeve around the same, that may be shaped to closely fit the cable shape all around and cut to the proper length, one end being square across and the other cut away at a slant or bevel, curved as shown at $h'$.

$h''$ and $h''$ represent the ends of two cables to be united, over one of which the sleeve $h$ is slipped with the beveled end outward. The lead arming and insulation is then removed to denude the wires to a length of, say, three-fourths of an inch (more or less) from each of the ends, as shown. Small tubes $d$, of copper or brass, say one inch long, more or less, are then placed over the wires of one end to half the length of the tube; then the wires of the matching cable are inserted at the other end and the end forced in, as shown at $d$ in section. The outer ends of the tubes may now be secured to the wires by a touch of solder, as shown at $i$. I next slide the sleeve over the joint, as shown at $x$, leaving a small opening into the seating space, as shown at $x$. Into this space I pour any proper hot melted insulating medium until the space is filled. The sleeve should then be pushed over to close the orifice to complete the joint. The end of the sleeve may then be soldered to the cable, if thought necessary.

Figs. 6, 7, 8 show, respectively, an exterior side elevation, a central vertical section, and a horizontal section through center of Fig. 6, as an earthenware testing-vault supposed to be buried beneath the surface to receive the cables and wires for inspection of their working efficiency.

$g$ $g$ represent perforations on opposite sides of the vault, the material being thickened or re-enforced on the inner sides, to provide increased strength for holding and surface for sealing the cables tightly therein, as shown at $g'$, the corresponding holes on the opposite side being left open to facilitate description.

$q$ shows a cast-iron cover having on its under side a thin sealing-ring, which takes into a recess, $u$, formed on the inside of the top edge of the vault, as shown.

$j$ shows a cross-bar of wood, the ends of which take under the projection formed by the recess before named on either side, to lock and hold tightly the cover, through a headed bolt that passes through the bar and the cover, and secured at its upper end by a screw-thread and nut, and made air-tight by an elastic washer of rubber or other substance. The recess at the top should be filled with any proper plastic or fluid material, preferably palm-oil, for sealing the cover tightly.

$w$ $w$ represent movable carrier-plates, of vulcanite or other proper material, upon fixed legs, which take into fastening-recesses in the plate below. $v$ $v$ show brass tubes secured to the plates $w$ $w$, and having headed set-screws at their either end, to receive the conducting-wires of the cable fixed therein after being denuded of their covering, the cables being passed through the holes $g$, where they are closely secured by any proper sealing medium against air or water.

This entire apparatus should be placed beneath the surface of the soil and closely covered at necessary intervals along the cable-train, and its locality clearly defined and described in a note-book kept for that purpose. The non-sonorous nature of lead particularly adapts it to the arming of telephonic wires. It may be placed but a few inches below the stones of a paved street without affecting at all the transmission of words through the wires.

The described cable is more pliable for the number of wires carried than any other, readily accommodating itself in a trench to any practical sinuosity or level or direction by the smallest curves, under ground or under water. Its trench never need exceed two feet in depth, in which any needed number of cables may be laid direct from a reel without any other preparation than a few inches of sifted earth or sand as a bed and covering, which is always preferable to have, whether the route be through dry or wet material.

Fig. 9 is a view in cross-section of the improved form of cable, approximating to a cross shape.

Lead-covered cables are usually made in such contrivances as are employed to construct leaden pipes or tubes, whereby the molten lead is forced from a cylinder by a close-fitting piston under hydrostatic pressure; but this peculiar described form of cable is designed to be made by other machinery and formed by grooved rollers, such apparatus, however, not being described or claimed in this application, as it will form the subject-matter of distinct Letters Patent.

While I have set forth the method of forming several distinct cables simultaneously by the use of a compound die, I would herein state that I intend filing separate application for said die, and therefore do not relinquish my right to the same.

What I claim, and desire to secure by Letters Patent, is—

1. The method herein described of uniting commercial lengths or sections of a lead-covered cable, which consists in denuding the wires by removing the lead and insulating-thread to a proper distance from the end, placing on one end of the cable a leaden tube, cut away as described, and also on each pair of matched wires a copper tube, as shown, then pushing forward the lead sleeve, so as to nearly cover the intervening recess, and then through the opening left thereby pouring a melted insulating material, and closing said orifice by the sleeve and soldering its end to the cable, as set forth.

2. An electric cable having a protective coating of an admixture of pulverized dry peaty matters with petroleum distillates or pitchy matters.

3. An angular electric cable formed as described, and having one of the angles formed by the sides thereof sharp or pointed, as an indicating-counter for the inclosed wires, particularly when said cable is twisted, in the manner and for the purpose set forth.

4. In a testing-chamber for an electric cable or wire conductor, the combination of a molded vessel of non-conducting material, said vessel being provided with a sealing-recess at the top, as described, and fitted with any proper sealing medium to receive a flange-like rim on the lower side of the cover, which is secured to the vessel by the headed bolt, the screw-nut, and cross-piece, all constructed and arranged in the manner and for the purpose substantially as described.

In testimony whereof I affix my signature in presence of two witnesses.

J. BURROWS HYDE.

Witnesses:
  I. H. HARRIS,
  S. C. WALKER.